(12) United States Patent
Song

(10) Patent No.: US 12,452,107 B2
(45) Date of Patent: Oct. 21, 2025

(54) MONITORING DATA PROCESSING MODEL FOR CHANNEL INFORMATION RECOVERY

(71) Applicant: NOKIA TECHNOLOGIES OY, Espoo (FI)

(72) Inventor: Nuan Song, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 358 days.

(21) Appl. No.: 18/248,859

(22) PCT Filed: Oct. 16, 2020

(86) PCT No.: PCT/CN2020/121484
§ 371 (c)(1),
(2) Date: Apr. 12, 2023

(87) PCT Pub. No.: WO2022/077436
PCT Pub. Date: Apr. 21, 2022

(65) Prior Publication Data
US 2023/0396466 A1 Dec. 7, 2023

(51) Int. Cl.
H04L 25/02 (2006.01)
(52) U.S. Cl.
CPC ...... *H04L 25/0224* (2013.01); *H04L 25/0254* (2013.01)
(58) Field of Classification Search
CPC .................. H04L 25/0224; H04L 25/0254
See application file for complete search history.

(56) References Cited

U.S. PATENT DOCUMENTS

| 2018/0367192 A1 | 12/2018 | O'Shea et al. |
| 2019/0190582 A1 | 6/2019 | Guo et al. |
| 2020/0052757 A1 | 2/2020 | Wang et al. |
| 2020/0169303 A1 | 5/2020 | Park et al. |

FOREIGN PATENT DOCUMENTS

| CN | 104662813 A | 5/2015 |
| CN | 104782166 A | 7/2015 |
| CN | 108400948 A | 8/2018 |
| CN | 109428639 A | 3/2019 |
| CN | 110198180 A | 9/2019 |
| CN | 110352568 A | 10/2019 |

(Continued)

OTHER PUBLICATIONS

International Search Report and Written Opinion for International Application No. PCT/CN2020/121484, mailed on Jul. 15, 2021, 6 pages.

(Continued)

*Primary Examiner* — Natasha W Cosme
(74) *Attorney, Agent, or Firm* — Brake Hughes Bellermann LLP

(57) ABSTRACT

Example embodiments of the present disclosure relate to monitoring a data processing model for channel information recovery. According to embodiments of the present disclosure, a solution for monitoring a data processing model for channel information is proposed. Two parallel measures by the data processing model for both the uplink and the downlink channels are used to determine whether the data processing model is available. In this way, it does not require extra feedbacks, which significantly reduces the overhead in the communication system and the computation efforts.

17 Claims, 8 Drawing Sheets

(56) References Cited

FOREIGN PATENT DOCUMENTS

| | | | |
|---|---|---|---|
| CN | 110679173 | A | 1/2020 |
| CN | 109687897 | B | 12/2021 |
| WO | 2010016996 | A1 | 2/2010 |
| WO | 2016011433 | A2 | 1/2016 |
| WO | 2018172896 | A1 | 9/2018 |
| WO | 2020042107 | A1 | 3/2020 |
| WO | 2021248280 | A1 | 12/2021 |

OTHER PUBLICATIONS

3GPP TSG RAN WG1 Meeting #96-Bis, R1-1904219; "Further Enhancements On Type-II CSI Reporting: Doppler-Domain Approach"; Agenda Item: 7.2.8.6—Others; Source: Fraunhofer IIS, Fraunhofer HHI; Xi'an, China; Apr. 8-12, 2019; 6 pages.
Office Action for India Application No. 202347033315, mailed on Mar. 8, 2024, 5 pages.
Office Action and Search Report for Chinese Application No. 202080106315.8, mailed on May 25, 2024, 11 pages.
Extended European Search Report for European Application No. 20957214.8, mailed on May 28, 2024, 8 pages.
TSG-RAN WG1 #56bis, R1-091342; "On UE Feedback to Support LTE-A MU-MIMO and CoMP Operations"; Source: Motorola; Agenda Item: 15.2; Mar. 23-27, 2009; 8 pages.

MONITORING DATA PROCESSING MODEL FOR CHANNEL INFORMATION RECOVERY

CROSS-REFERENCE TO RELATED APPLICATIONS

This application is a national stage entry of International Application No. PCT/CN2020/121484, filed Oct. 16, 2020, entitled "MONITORING DATA PROCESSING MODEL FOR CHANNEL INFORMATION RECOVERY" which is hereby incorporated by reference in its entirety.

FIELD

Embodiments of the present disclosure generally relate to the field of telecommunication and in particular, to methods, devices, apparatuses and computer readable storage medium for monitoring a data processing model for channel information recovery.

BACKGROUND

In wireless communications, channel information (for example, channel state information (CSI)) refers to known channel properties of a communication link. This information describes how a signal propagates from the transmitter to the receiver and represents the combined effect of, for example, scattering, fading, and power decay with distance. The CSI makes it possible to adapt transmissions to current channel conditions, which is crucial for achieving reliable communication with high data rates in multiantenna systems. Several solutions for obtaining the CSI have been proposed. Thus, it is very important to monitor whether the solutions for obtaining the CSI is available.

SUMMARY

In general, example embodiments of the present disclosure provide a solution for monitoring a data processing model for channel information recovery.

In a first aspect, there is provided a first device. The first device comprises at least one processor; and at least one memory including computer program codes; the at least one memory and the computer program codes are configured to, with the at least one processor, cause the first device to receive, from at least one second device, a first reference signal on an uplink channel. The first device is also caused to determine first channel information on the uplink channel based at least in part on the reference signal using a data processing model. The first device is further caused to determine a difference between the first channel information and second channel information estimated based on the reference signal. The first device is yet caused to recover third channel information on a downlink channel from a feedback signal from the at least one second device using the data processing model. The first device is also caused to update the data processing model based on the difference and the third channel information.

In a second aspect, there is provided a second device. The second device comprises at least one processor; and at least one memory including computer program codes; the at least one memory and the computer program codes are configured to, with the at least one processor, cause the second device to transmit, to a first device, a first reference signal on an uplink channel, the first reference signal for determining first channel information and second channel information on the uplink channel, and the first channel information being for determining a data processing model to be for recovering channel information on a downlink channel between the first device and the second device. The second device is further caused to transmit a feedback signal to the first device, the feedback signal being for recovering third channel information on a downlink channel between the first device and the second device.

In a third aspect, there is provided a method. The method comprises receiving, at a first device and from at least one second device, a first reference signal on an uplink channel. The method also comprises determining first channel information on the uplink channel based at least in part on the reference signal using a data processing model. The method further comprises determining a difference between the first channel information and second channel information estimated based on the reference signal. The method yet comprises recovering third channel information on a downlink channel from a feedback signal from the at least one second device using the data processing model. The method further comprises updating the data processing model based on the difference and the third channel information.

In a fourth aspect, there is provided a method. The method comprises transmitting, at a second device and to a first device, a first reference signal on an uplink channel, the first reference signal for determining first channel information and second channel information on the uplink channel, and the first channel information being for determining a data processing model to be for recovering channel information on a downlink channel between the first device and the second device. The method also comprises transmitting a feedback signal to the first device, the feedback signal being for recovering third channel information on a downlink channel between the first device and the second device.

In a fifth aspect, there is provided an apparatus. The apparatus comprises means for receiving, at a first device and from at least one second device, a first reference signal on an uplink channel; means for determining first channel information on the uplink channel based at least in part on the reference signal using a data processing model; means for determining a difference between the first channel information and second channel information estimated based on the reference signal; means for recovering third channel information on a downlink channel from a feedback signal from the at least one second device using the data processing model; and means for updating the data processing model based on the difference and the third channel information.

In a sixth aspect, there is provided an apparatus. The apparatus comprises means for transmitting, at a second device and to a first device, a first reference signal on an uplink channel, the first reference signal for determining first channel information and second channel information on the uplink channel, and the first channel information being for determining a data processing model to be for recovering channel information on a downlink channel between the first device and the second device; and means for transmitting a feedback signal to the first device, the feedback signal being for recovering third channel information on a downlink channel between the first device and the second device.

In a seventh aspect, there is provided a computer readable medium. The computer readable medium comprises program instructions for causing an apparatus to perform at least the method according to any one of the above third and fourth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
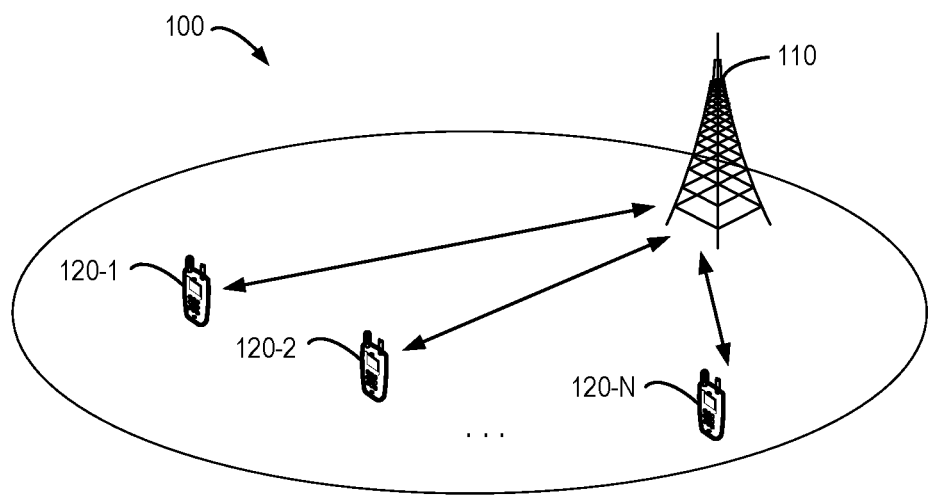
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable):
      (i) a combination of analog and/or digital hardware circuit(s) with software/firmware and
      (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated and Access Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned above, how to obtain the CSI is very important for communication performance. The Machine Learning (ML) based Multiple Input and Multiple Output (MIMO) attracts significant attentions and shows its advantages especially in the physical layer solutions such as beamforming and Channel State Information (CSI) acquisition. The ML based massive MIMO schemes can provide a performance enhancement and reduce the computational complexity, overhead, as well as latency.

A lot of ML schemes on CSI acquisition (for example, including channel estimation, feedback and the like) and beamforming may train the Neural Network (NN) offline using statistical channel models, ray-tracing generated data, or measurement data, for analysis purpose. Since the dataset used in the pre-training cannot totally represent the real environment, when such an NN is deployed in practice, it requires a further training to update the weights of the pre-trained NN. In some other cases, it might be also possible to directly train the NN in the deployed real scenario. For example, in the CSI feedback and channel estimation applications, training of the NN requires paired dataset (for example, the true or "reference" CSI and the compressed CSI), however, it is extremely difficult to obtain the true CSI in practice. Some conventional technologies only assume that the exact CSI can be obtained to train or update the NN in the deployment.

During implementation of NN, one problem is that in the NN operating phase, the NN may not always work. Therefore, a monitoring mechanism is required to detect errors or malfunction of the NN.

According to embodiments of the present disclosure, a solution for monitoring a data processing model for channel information is proposed. Two parallel measures by the data processing model for both the uplink and the downlink channels are used to determine whether the data processing model is available. In this way, it does not require extra feedbacks, which significantly reduces the overhead in the communication system and the computation efforts.

FIG. 1 illustrates a schematic diagram of a communication environment 100 in which embodiments of the present disclosure can be implemented. The communication environment 100 comprises a first device 110. The communication environment 100, which is a part of a communication network, further comprises a device 120-1, a device 120-2, . . . , a device 120-N, which can be collectively referred to as "second device(s) 120." The first device 110 and the second device 120 can communicate with each other.

The communication environment 100 may comprise any suitable number of devices and cells. In the communication environment 100, the first device 110 and the second device 120 can communicate data and control information to each other. In the case that the first device 110 is the network device and the second device 120 is the terminal device, a link from the second device 120 to the first device 110 is referred to as an uplink (UL), while a link from the first device 110 to the second device 120 is referred to as a downlink (DL). The second device 120 and the first device 110 are interchangeable.

It is to be understood that the number of first devices and cells and their connections shown in FIG. 1 is given for the purpose of illustration without suggesting any limitations. The communication environment 100 may include any suitable number of devices and networks adapted for implementing embodiments of the present disclosure.

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
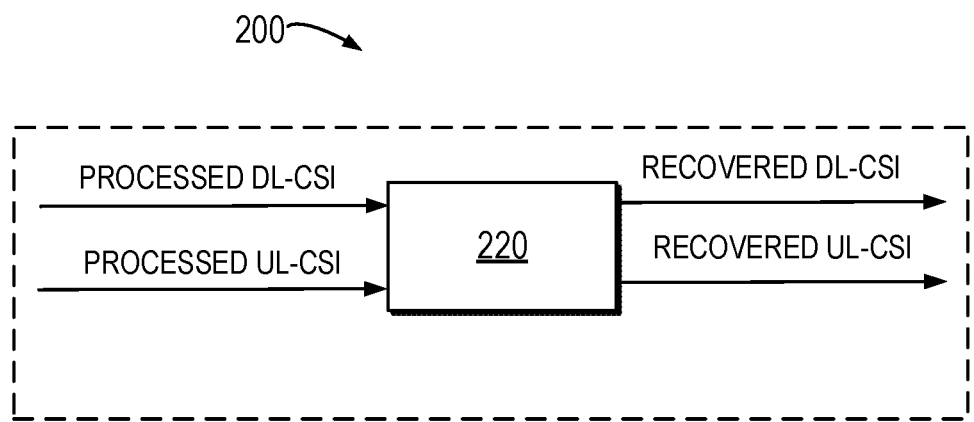
FIG. 2 illustrates a simplified block diagram of training model according to some example embodiments of the present disclosure.

FIG. 2 illustrates a simplified block diagram of an apparatus 200 for training model according to some example embodiments of the present disclosure. The apparatus 200 can be implemented at the first device 110. Alternatively, the apparatus 200 may be implemented at the second device 120. It should be noted that embodiments of the present disclosure are not limited to this aspect.

The apparatus 200 may comprise a module 210 which can be used for recovering uplink information and downlink information using the data processing model. For example, the module 210 may recover the downlink channel information from the processed downlink information and recover the uplink channel information from the processed uplink information. The recovered downlink channel information and the processed channel downlink information are compared and the recovered uplink channel information and the processed channel uplink information are compared. The data processing model is updated based on the comparisons. The apparatus 200 may be implemented in the first device 110. Further, it does not require extra CSI feedback, which significantly reduces the overhead. It also alleviates implementation efforts on the terminal device side, since no complicated CSI processing is required.

Figure 3:
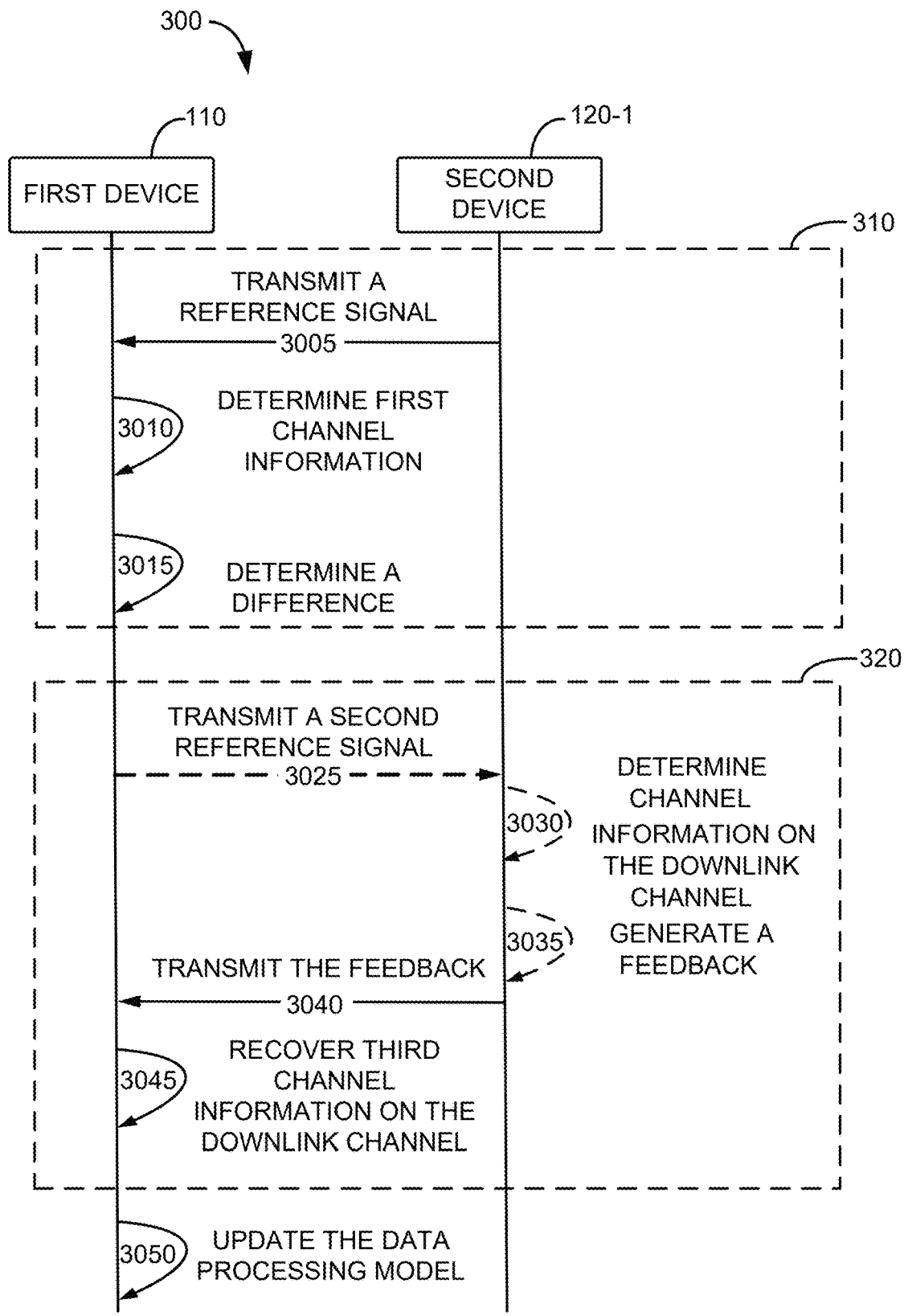
FIG. 3 illustrates a signaling flow for applying uplink channel information to determine data processing model deployed for downlink use according to some example embodiments of the present disclosure.

Example embodiments of the present disclosure will be described in detail below with reference to the accompanying drawings. Reference is now made to FIG. 3, which illustrates a signaling flow 300 for training a downlink data processing model with uplink channel information according to example embodiments of the present disclosure. For the purpose of discussion, the signaling flow 300 will be described with reference to FIG. 1. The signaling flow 300 may involve the first device 110 and the second device 120-1. As shown in FIG. 3, the signaling flow 300 has two portions 310 and 320. It should be noted that the two portions 310 and 320 may happen in any suitable order. For example, steps in the portion 310 and steps in the portion 320 may take place in parallel. In other embodiments, the steps in the portion 310 may be performed before or after the portion 320.

The second device 120-1 transmits 3005 a first reference signal on an uplink channel to the first device 110. The first reference signal may be any suitable signals which can be used for channel estimation. For example, the first reference signal may be a sounding reference signal (SRS). Alternatively, a demodulation reference signal may be used.

In some example embodiment, the second device 120-1 may compensate the reference signal before transmission. For example, the compensation parameter may be determined based on a frequency of the uplink channel (referred to as "first frequency" hereinafter) and a frequency of the downlink channel (referred to as "second frequency" hereinafter). The second device 120-1 may apply the compensation parameter to the reference signal. For example, the phase of the reference signal can be compensated based on the compensation parameter. From antenna point of view: the antenna array response depends on the carrier frequency.

By way of example, the reference signal to be transmitted at the second device 120-1 can be represented as s. Thus, the compensated reference signal can be represented as $P_R^H s$, where the transmit compensation matrix at the second device 120-1 is $P_R \in C^{M_R \times M_R}$.

In some example embodiments, the first device 110 may also compensate the received reference signal. For example, the compensation parameter may be determined based on the first frequency and the second frequency and may be applied to the received reference signal. The first device 110 may compensate a phase of the received reference signal based on the compensation parameter. In some example embodiments, the received reference signal can be represented as:

$$\bar{y} H_{UL} P_R^H s + n \in C^{M_r} \quad (1)$$

where s represents the original reference signal, $H_{UL} = A_{T,UL}$ diag($\gamma$) $A_{R,UL}^H$ represents the uplink CSI and n is the additive white Gaussian noise.

The first device 110 determines 3010 first channel information based on the reference signal on the uplink channel using a data processing model. In some embodiments, the processed channel information may have less information than the original channel information. In some example embodiments, the processed channel information can be generated by compressing the original channel information. Alternatively or in addition, the original channel information can be quantized to obtain the processed channel information. In other embodiments, the processed channel information may be codebook based information. The processed channel information may be able to represent the original channel information but more concise than the first channel information. It should be noted that the processed channel information can be obtained by using any suitable processing. Embodiments of the present disclosure are not limited to this aspect. In some example embodiments, the processed channel information can be obtained in a similar way as the UE generating processed UL-CSI. For example, the first device 110 and the second device 120-1 may utilize the same processing to obtain the second channel information and the processed UL-CSI, respectively.

For example, the first device 110 may determine the original reference signal (for example, represented as "s" in formula (1)) which is transmitted by the second device 120-1. Since the uplink channel between the first device 110 and the second device 120-1 is not an ideal channel, the reference signal transmitted at the second device 120-1 and the reference signal received at the first device 110 may not be the same. The original reference signal refers to the reference signal without any attenuation, interferences or noise. In some example embodiments, the original reference signal may be predetermined so that the first device 110 is able to obtain the original reference signal. In some example embodiments, the original channel information may be represented as:

$$\tilde{H}_{UL} = P_T H_{UL} P_R^H = P_T A_{T,UL} \text{diag}(\gamma)(P_R A_{R,UL})^H = A_{T,DL} \text{diag}(\gamma) A_{R,DL}^H \quad (2)$$

where $P_T \in C^{M_T \times M_T}$ refers to the receive compensation matrix at the first device 110, which is achieved by $A_{T,DL} = P_T A_{T,UL}$, and $H_{UL} = A_{T,UL}$ diag($\gamma$) $A_{R,UL}^H$ represents the uplink CSI.

Alternatively, the first device 110 may monitor the uplink channel to receive the reference signal during a predetermined period. The first device 110 may receive any suitable number of reference signals. The first channel information may be determined based on the reference signals received during the predetermined period. For example, the first device 110 may receive one or more reference signals for a predetermined duration. Alternatively, if the number of data bursts received by the first device 110 is below a threshold number, the first device 110 may continue monitoring the uplink channel and receiving the reference signal(s).

The first device 110 may estimate second channel information on the uplink channel based on the reference signal. For example, the first device 110 may extract uplink CSI from the reference signal. The second channel information may be determined based on the extracted uplink CSI.

The first device 110 determines 3015 a difference between the first channel information and the second channel information. Only as an example, the first device 110 may determine normalized mean-square error (NMSE) between the first channel and the second channel information. The NMSE can be obtained by:

$$M_1 = \text{NMSE} = \mathbb{E}\{\|H_{UL} - \widehat{H_{UL}}\|_F^2 / \|H_{UL}\|_F^2\} \quad (3)$$

where $\| \ \|_F$ represents the Frobinius norm of a matrix, HUL represents the uplink CSI and the $\widehat{H_{UL}}$ represents the recovered CSI (i.e., the first information). It should be noted that the difference between the first channel information and the second channel information may be determined using any suitable manners. Similarly, the individual NMSE for the channel of the kth second device can be calculated and denoted by $M^{(k)}_1$.

In some embodiments, the first device 110 may transmit 3025 a second reference signal on a downlink channel to the second device 120-1. For example, the further reference signal may be CSI reference signal. Alternatively, demodulation reference signal can be transmitted.

The second device 120-1 may determine 3030 channel information on the downlink channel based on the further reference signal. For example, the second device 120-1 may estimate the channel information on the downlink channel. The second device 120 may further extract the channel information on the downlink channel. By way of example, the channel information can be compressed. Alternatively, the second device 120-1 may quantize the channel information on the downlink channel.

The second device 120-1 may generate 3035 a feedback signal to the second reference signal. The feedback signal may comprise the extracted channel information on the downlink channel. The second device 120-1 may transmit 3040 the feedback signal to the first device 110.

The first device 110 recovers 3045 third channel information on the downlink channel from the feedback signal using the trained data processing model. In this way, the downlink channel information can be recovered without extra overheads. Only as an example, the third channel information can be represented as:

$$M_2^{(k)} = \mathcal{F}\left\{\left|I + \frac{R^{(k)}}{R_{nn}^{(k)}}\right|\right\}, M_2 = \sum_{k=1}^{K} M_2^{(k)} \qquad (4)$$

where $\mathcal{F}\{a\}$ denotes the mapping from a to achievable rate and $|\ |$ represents the determinate (products of eigenvalues). The covariance matrix of the effective channel $R^{(k)} = \hat{H}_{DL}^{(k)} F(\hat{H}_{DL}^{(k)} F)^H$ represents a desired signal power, where F is a precoding matrix designed based on $\hat{H}_{DL}$. $R_{nn}^{(k)}$ represents the covariance matrix of the signal and interference for the kth second device 120-k (not shown). It should be noted that the third channel information may be determined using any suitable manners.

The first device 110 updates 3050 the data processing model based on the difference and the third channel information. For example, the first device 110 may update certain layer(s) of the data processing model based on the difference and the third channel information. In this way, the data processing model may be monitored based on the uplink channel information and the downlink channel information. It does not need extra channel state information feedback, which significantly reduces the overhead and computation burden.

In some embodiments, the first device 110 may determine whether the difference exceeds a threshold difference. For example, the threshold difference may be determined based on previous training performance. The first device 110 may also determine whether the channel quality of the downlink channel exceeds a threshold quality based on the third information. The threshold quality may be determined based on legacy system's performance experiences. If the difference for majority of the second devices is the below threshold difference, the measure for the uplink can be regarded as normal. Similarly, if the channel quality for majority of the second devices exceeds the threshold quality, the measure for the downlink can be regarded as normal.

If the difference is below the threshold difference and channel quality exceeds the threshold quality, the first device 110 may further determine, for each second device 120, whether the difference exceeds the threshold difference and the channel quality exceeds the threshold quality. For example, for the $k^{th}$ second device 120-k, if the difference is below the threshold difference and channel quality exceeds the threshold quality, the data processing model may be maintained. The $k^{th}$ second device 120-k may be scheduled by the first device 110. Alternatively, for the $k^{th}$ second device 120-k, if the difference is below the threshold difference and channel quality is below the threshold quality, the data processing model may be maintained. The $k^{th}$ second device 120-k may not be scheduled by the first device 110.

In other embodiments, for the $k^{th}$ second device 120-k, if the difference exceeds the threshold difference and channel quality exceeds the threshold quality, the data processing model may be maintained. The first device 110 may trigger the $k^{th}$ second device 120-k to transmit a third reference signal on the uplink channel. For example, the first device 110 may transmit an indication for triggering the transmission of the third reference signal. The $k^{th}$ second device 120-k may transmit the third reference signal. The first device 110 may re-evaluate the difference based on the third reference signal. The third reference signal may be any suitable signals which can be used for channel estimation. For example, the third reference signal may be a SRS. Alternatively, a demodulation reference signal may be used. In some example embodiments, the first device 110 may re-evaluate the channel quality based on the feedback signal. Alternatively, the channel quality may be re-evaluated based on a further feedback signal received from the $k^{th}$ second device 120-k. In some embodiments, if the re-evaluated difference is below the threshold difference, the data processing model may not be updated. Alternatively, the data processing model may be updated based on the third reference signal. For example, if the re-evaluated difference exceeds the threshold difference and the re-evaluated channel quality is below the threshold quality, the data processing model needs to be updated. The $k^{th}$ second device 120-k may be scheduled by the first device 110. Alternatively, for the $k^{th}$ second device 120-k, if the difference is below the threshold difference and channel quality is below the threshold quality, the data processing model may be maintained. The first device 110 may collect uplink data from the $k^{th}$ second device 120-k. The $k^{th}$ second device 120-k may not be scheduled by the first device 110.

In some embodiments, if the difference exceeds the threshold difference and the channel quality exceeds the threshold quality, the data processing model may be active. The first device 110 may trigger the second devices 120 to transmit a fourth reference signal on the uplink channel. For example, the first device 110 may transmit an indication for triggering the transmission of the fourth reference signal. The second devices 120 may transmit the fourth reference signal. The first device 110 may re-evaluate the difference based on the fourth reference signal. In some example embodiments, the first device 110 may re-evaluate the channel quality based on the feedback signal. Alternatively, the channel quality may be re-evaluated based on a further feedback signal received from the $k^{th}$ second device 120-k. In some embodiments, if the re-evaluated difference is below the threshold difference, the data processing model may not be updated. Alternatively, the data processing model may be updated based on the fourth reference signal. If the re-evaluated difference still exceeds the threshold difference and the re-evaluated channel quality is below the threshold quality, the data processing model may be updated. The fourth reference signal may be any suitable signals which can be used for channel estimation. For example, the fourth reference signal may be a SRS. Alternatively, a demodulation reference signal may be used.

In other embodiments, when the measure for the downlink channel ($M_2$) is abnormal, meaning that the data processing model has a malfunction, the first device 110 may switch to the non-NN mode. For example, if the difference is below the threshold difference and the channel quality is below the threshold quality, the data processing model may be inactive. The first device 110 may switch to a non-NN processing model. In other embodiments, if the difference exceeds the threshold difference and the channel quality is below the threshold quality, the data processing model may be inactive. The first device 110 may switch to a non-NN processing model and may update the data processing model based on the first reference signal. Table 1 below shows example criteria and decisions for monitoring the data processing model. It should be noted that table 1 is only an example not limitation.

TABLE 1

| $M_1$ (The difference) | $M_2$ (The third channel information) | $M_1^{(k)}$ (The difference for the $k^{th}$ second device) | $M_2^{(k)}$ (The third information for the $k^{th}$ second device) | Cases & Action |
|---|---|---|---|---|
| normal | normal | good | good | NN active; Normal schedule (the $k^{th}$ second device scheduled) |
|  |  |  | bad | NN active; Normal schedule (the $k^{th}$ second device not scheduled) |
|  |  | bad | good | NN active; Trigger next UL training reference signal for the $k^{th}$ second device; Track & re-evaluate M1 and M2; Normal schedule (the $k^{th}$ second device scheduled) |
|  |  |  | bad | NN active The $k^{th}$ second device is a new situation & Collect data (current UL training reference signal for the $k^{th}$ second device) the $k^{th}$ second device not scheduled |
| abnormal | normal | — |  | NN active & normal schedule; Trigger next UL training reference signal for all second devices; |

TABLE 1-continued

| $M_1$ (The difference) | $M_2$ (The third channel information) | $M_1^{(k)}$ (The difference for the $k^{th}$ second device) | $M_2^{(k)}$ (The third information for the $k^{th}$ second device) | Cases & Action |
|---|---|---|---|---|
|  |  |  |  | Track & re-evaluate M1 and M2; |
| normal | abnormal | — |  | NN inactive & Switch non-NN mode |
| abnormal | abnormal | — |  | NN inactive & Switch non-NN mode New situation & collect data (current UL training reference signal for all second devices) |

Figure 4:
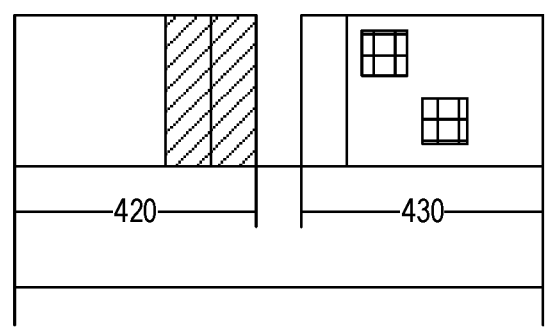
FIG. 4 illustrates a flowchart of a method implemented at a first apparatus according to some example embodiments of the present disclosure.

In order to monitor the data processing model accurately, the uplink and downlink channels may be in the same situation without much delay and mismatch. Therefore, the downlink subframe of transmitting CSI-RS to measure the downlink CSI and the uplink subframe of transmitting the uplink training RS should be close. FIG. 4 shows a schematic diagram of a subframe structure. As shown in FIG. 4, the uplink reference signal may be transmitted in the uplink subframe 420 and the downlink reference signal may be transmitted in the downlink subframe 430. In other words, the transmitting of the uplink reference signal and the downlink reference signal may be transmitted in consecutive uplink/downlink subframes.

Figure 5:
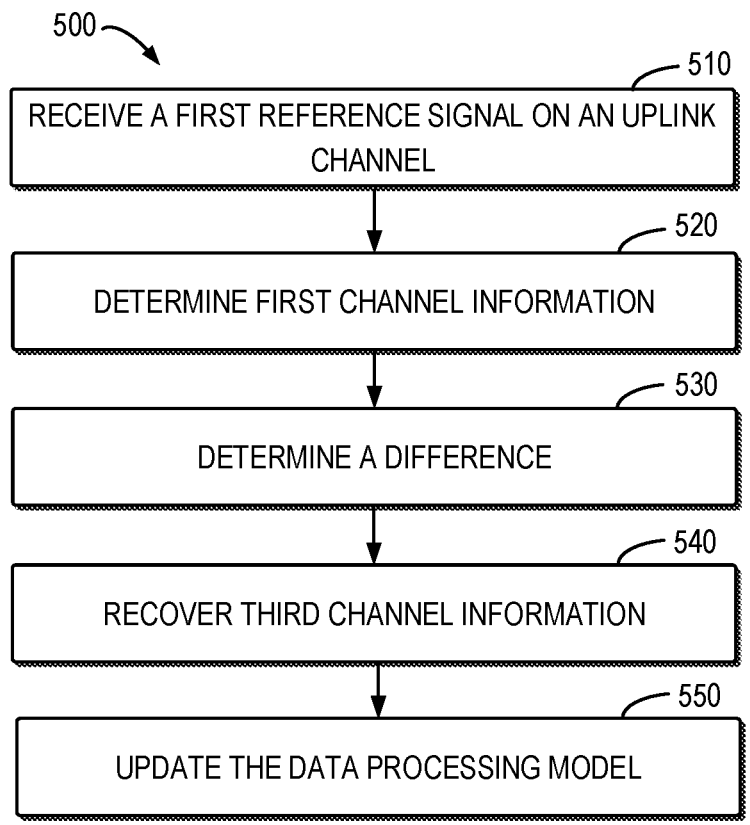
FIG. 5 illustrates a schematic diagram of a subframe structure according to some example embodiments of the present disclosure.

FIG. 5 shows a flowchart of an example method 500 implemented at a first device 110 in accordance with some example embodiments of the present disclosure. For the purpose of discussion, the method 500 will be described from the perspective of the first device 110.

At block 510, the first device 110 receives a first reference signal on an uplink channel from the second device 120-1. The reference signal may be any suitable signals which can be used for channel estimation. For example, the reference signal may be a sounding reference signal (SRS). Alternatively, a demodulation reference signal may be used.

In some example embodiments, the first device 110 may also compensate the received reference signal. For example, the compensation parameter may be determined based on the first frequency and the second frequency and may be applied to the received reference signal. The first device 110 may compensate a phase of the received reference signal based on the compensation parameter.

At block 520, the first device 110 determines first channel information based on the reference signal on the uplink channel using a data processing model. In some embodiments, the processed channel information may have less information than the original channel information. In some example embodiments, the processed channel information can be generated by compressing the original channel information. Alternatively or in addition, the original channel information can be quantized to obtain the processed channel information. In other embodiments, the processed channel information may be codebook based information. The processed channel information may be able to represent the original channel information but more concise than the first channel information. It should be noted that the processed channel information can be obtained by using any suitable processing. Embodiments of the present disclosure are not limited to this aspect. In some example embodiments, the processed channel information can be obtained in a similar way as the UE generating processed UL-CSI. For example, the first device 110 and the second device 120-1 may utilize the same processing to obtain the second channel information and the processed UL-CSI, respectively.

In some embodiments, the first device 110 may estimate second channel information on the uplink channel based on the reference signal. For example, the first device 110 may extract uplink CSI from the reference signal. The second channel information may be determined based on the extracted uplink CSI.

At block 530, the first device 110 determines a difference between the first channel information and the second channel information. Only as an example, the first device 110 may determine normalized mean-square error (NMSE) between the first channel and the second channel information.

In some embodiments, the first device 110 may transmit 3025 a second reference signal on a downlink channel to the second device 120-1. For example, the further reference signal may be CSI reference signal. Alternatively, demodulation reference signal can be transmitted.

At block 540, the first device 110 recovers 3045 third channel information on the downlink channel from the feedback signal using the trained data processing model. In this way, the downlink channel information can be recovered without extra overheads.

At block 550, the first device 110 updates the data processing model based on the difference and the third channel information. In this way, the data processing model may be monitored based on the uplink channel information and the downlink channel information. It does not need extra channel state information feedback, which significantly reduces the overhead and computation burden.

In some embodiments, the first device 110 may determine whether the difference exceeds a threshold difference. For example, the threshold difference may be determined based on previous training performance. The first device 110 may also determine whether the channel quality of the downlink channel exceeds a threshold quality based on the third information. The threshold quality may be determined based on legacy system's performance experiences. If the difference for majority of the second devices is the below threshold difference, the measure for the uplink can be regarded as normal. Similarly, if the channel quality for majority of the second devices exceeds the threshold quality, the measure for the downlink can be regarded as normal.

If the difference is below the threshold difference and channel quality exceeds the threshold quality, the first device 110 may further determine, for each second device 120, whether the difference exceeds the threshold difference and the channel quality exceeds the threshold quality. For example, for the $k^{th}$ second device 120-$k$, if the difference is below the threshold difference and channel quality exceeds the threshold quality, the data processing model may be maintained. The $k^{th}$ second device 120-$k$ may be scheduled by the first device 110. Alternatively, for the $k^{th}$ second device 120-$k$, if the difference is below the threshold difference and channel quality is below the threshold quality, the data processing model may be maintained. The $k^{th}$ second device 120-$k$ may not be scheduled by the first device 110.

In other embodiments, for the $k^{th}$ second device 120-$k$, if the difference exceeds the threshold difference and channel quality exceeds the threshold quality, the data processing model may be maintained. The first device 110 may trigger the $k^{th}$ second device 120-$k$ to transmit a third reference signal and re-evaluate the difference based on the third reference signal. In some example embodiments, the first device 110 may re-evaluate the third channel information based on the feedback signal. Alternatively, the third channel information may be re-evaluated based on a further feedback signal received from the $k^{th}$ second device 120-$k$. In some embodiments, if the re-evaluated difference is below the threshold difference, the data processing model may not be updated. Alternatively, the data processing model may be updated based on the third reference signal. For example, if the re-evaluated difference exceeds the threshold difference and the re-evaluated channel quality is below the threshold quality, the data processing model needs to be updated. The $k^{th}$ second device 120-$k$ may be scheduled by the first device 110. Alternatively, for the $k^{th}$ second device 120-$k$, if the difference is below the threshold difference and channel quality is below the threshold quality, the data processing model may be maintained. The first device 110 may collect uplink data from the $k^{th}$ second device 120-$k$. The first device 110 may update the processing data model based on the first reference signal. The $k^{th}$ second device 120-$k$ may not be scheduled by the first device 110.

In some embodiments, if the difference exceeds the threshold difference and the channel quality exceeds the threshold quality, the data processing model may be active. The first device 110 may trigger the second devices 120 to transmit a fourth reference signal on the uplink channel and re-evaluate the difference based on the fourth reference signal. In some example embodiments, the first device 110 may re-evaluate the third channel information based on the feedback signal. Alternatively, the third channel information may be re-evaluated based on a further feedback signal received from the $k^{th}$ second device 120-$k$. In some embodiments, if the re-evaluated difference is below the threshold difference, the data processing model may not be updated. Alternatively, the data processing model may be updated based on the fourth reference signal. If the re-evaluated difference still exceeds the threshold difference and the re-evaluated channel quality is below the threshold quality, the data processing model may be updated.

In other embodiments, when the measure for the downlink channel (M 2) is abnormal, meaning that the data processing model has a malfunction, the first device 110 may switch to the non-NN mode. For example, if the difference is below the threshold difference and the channel quality is below the threshold quality, the data processing model may be inactive. The first device 110 may switch to a non-NN processing model. In other embodiments, if the difference exceeds the threshold difference and the channel quality is below the threshold quality, the data processing model may be inactive. The first device 110 may switch to a non-NN processing model and may update the data processing model based on the first reference signal.

Figure 6:
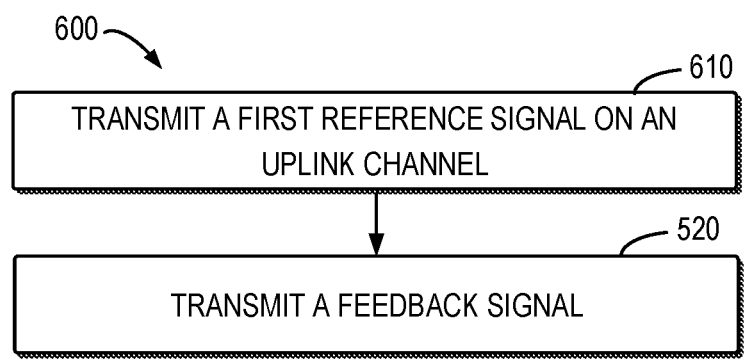
FIG. 6 illustrates a flowchart of a method implemented at a second apparatus according to some other example embodiments of the present disclosure.

FIG. 6 shows a flowchart of an example method 600 implemented at a second device 120 in accordance with some example embodiments of the present disclosure. For the purpose of discussion, the method 600 will be described from the perspective of the second device 120. It should be noted that the dashed blocks are optional.

At block 610, the second device 120-1 transmits 3005 a first reference signal on an uplink channel to the first device 110. The reference signal may be any suitable signals which can be used for channel estimation. For example, the reference signal may be a sounding reference signal (SRS). Alternatively, a demodulation reference signal may be used.

In some example embodiment, the second device 120-1 may compensate the reference signal before transmission. For example, the compensation parameter may be determined based on a frequency of the uplink channel (referred to as "first frequency" hereinafter) and a frequency of the downlink channel (referred to as "second frequency" hereinafter). The second device 120-1 may apply the compensation parameter to the reference signal. For example, the phase of the reference signal can be compensated based on the compensation parameter. From antenna point of view: the antenna array response depends on the carrier frequency.

In some embodiments, the second device 120 may receive a second reference signal on the downlink channel from the first device 110. For example, the further reference signal may be CSI reference signal. Alternatively, demodulation reference signal can be transmitted.

The second device 120-1 may determine channel information on the downlink channel based on the further reference signal. For example, the second device 120-1 may estimate the channel information on the downlink channel. The second device 120 may further extract the channel information on the downlink channel. By way of example, the channel information can be compressed. Alternatively, the second device 120-1 may quantize the channel information on the downlink channel.

The second device 120-1 may generate 3035 a feedback signal to the second reference signal. The feedback signal may comprise the extracted channel information on the downlink channel.

At block 620, the second device 120-1 transmits the feedback signal to the first device 110. The feedback signal is used for recovering third channel information on a downlink channel between the first device and the second device.

In some example embodiments, a first apparatus capable of performing any of the method 500 (for example, the first device 110) may comprise means for performing the respective operations of the method 500. The means may be implemented in any suitable form. For example, the means may be implemented in a circuitry or software module. The first apparatus may be implemented as or included in the first device 110. In some example embodiments, the means may comprise at least one processor and at least one memory including computer program code. The at least one memory and computer program code are configured to, with the at least one processor, cause performance of the apparatus.

In some embodiments, the apparatus comprises means for receiving, at a first device and from at least one second device, a first reference signal on an uplink channel; means for determining first channel information on the uplink channel based at least in part on the reference signal using a data processing model; means for determining a difference between the first channel information and second channel information estimated based on the reference signal; means for recovering third channel information on a downlink channel from a feedback signal from the at least one second device using the data processing model; and means for updating the data processing model based on the difference and the third channel information.

In some embodiments, the apparatus further comprises means for transmitting a second reference signal on the downlink channel to the at least one second device; and means for receiving from the at least one second device the feedback signal to the second reference signal, the feedback signal comprising extracted channel information on the downlink channel.

In some embodiments, the means for determining the first channel information comprises: means for determining an original reference signal transmitted by the at least one second device; means for determining original channel information based on the original reference signal and the received reference signal; and means for recovering the first channel information from the original channel information using the data processing model.

In some embodiments, the means for updating the processing model comprises: means for determining whether the difference exceeds a threshold difference; means for determining whether a channel quality of the downlink channel exceeds a threshold quality based on the third information; and means for in accordance with a determination that the difference is below the threshold difference and the channel quality exceeds the threshold quality, causing the data processing model to be maintained.

In some embodiments, the apparatus further comprises means for: for a target second device in the at least one second device, means for determining whether the difference exceeds a threshold difference; means for determining whether the channel quality of the downlink channel between the first device and the target second device exceeds a threshold quality based on the third information; and means for in accordance with a determination that the difference is below the threshold difference and the channel quality is below the threshold quality, causing scheduling of the target second device to be skipped.

In some embodiments, the apparatus further comprises means for: for a target second device in the at least one second device, determining whether the difference exceeds a threshold difference; determining whether the channel quality of the downlink channel between the first device and the target second device exceeds a threshold quality based on the third information; in accordance with a determination that the difference exceeds the threshold difference and the channel quality exceeds the threshold quality, receiving a third reference signal on the uplink channel from the target second device; re-evaluating the difference based on the third reference signal; re-evaluate the channel quality based on the feedback signal or a further feedback signal received from the at least one second device.

In some example embodiments, the apparatus further comprises means for updating the data processing model based on the third reference signal.

In some embodiments, the apparatus further comprises means for: for a target second device in the at least one second device, determining whether the difference exceeds a threshold difference; determining whether the channel quality of the downlink channel between the first device and the target second device exceeds a threshold quality based on the third information; and in accordance with a determination that the difference exceeds the threshold difference and the channel quality is below the threshold quality, causing scheduling of the target second device to be skipped; and updating the data processing model based on the first reference signal.

In some embodiments, the means for updating the processing model comprises: means for determining whether the difference exceeds a threshold difference; means for determining whether the channel quality of the downlink channel between the first device and the target second device exceeds a threshold quality based on the third information; means for in accordance with a determination that the difference exceeds the threshold difference and the channel quality exceeds the threshold quality, receiving a fourth reference signal on the uplink channel from the at least one second device; means for re-evaluating the difference based on the fourth reference signal; and means for re-evaluating the channel quality based on the feedback signal or a further feedback signal received from the at least one second device.

In some example embodiments, the apparatus further comprises means for updating the data processing model based on the fourth reference signal.

In some embodiments, the means for updating the processing model comprises: means for determining whether the difference exceeds a threshold difference; means for determining whether a channel quality of the downlink channel exceeds a threshold quality based on the third information; means for in accordance with a determination that the difference is below the threshold difference and the channel quality is below the threshold quality, causing the data processing model to be inactive; and means for switching to a non-neutral network processing mode.

In some embodiments, the means for updating the processing model comprises: means for determining whether the difference exceeds a threshold difference; means for determining whether a channel quality of the downlink channel exceeds a threshold quality based on the third information; means for in accordance with a determination that the difference is above the threshold difference and the channel quality is below the threshold quality, causing the data processing model to be inactive; means for switching to a non-neutral network processing mode; and means for updating the data processing model based on the first reference signal.

In some example embodiments, a second first apparatus capable of performing any of the method 600 (for example, the second device 120) may comprise means for performing the respective operations of the method 600. The means may be implemented in any suitable form. For example, the means may be implemented in a circuitry or software module. The first apparatus may be implemented as or included in the second device 120. In some example embodiments, the means may comprise at least one processor and at least one memory including computer program code. The at least one memory and computer program code are configured to, with the at least one processor, cause performance of the apparatus.

In some embodiments, the apparatus comprises means for transmitting, at a second device and to a first device, a first reference signal on an uplink channel, the first reference signal for determining first channel information and second channel information on the uplink channel, and the first channel information being for determining a data processing model to be for recovering channel information on a downlink channel between the first device and the second device; and means for transmitting a feedback signal to the first device, the feedback signal being for recovering third channel information on a downlink channel between the first device and the second device.

In some embodiments, the apparatus further comprises means for means for receiving a second reference signal on the downlink channel from the first device; and wherein means for transmitting the feedback signal comprises: means for transmitting the feedback signal comprising extracted channel information on the downlink channel.

In some embodiments, the apparatus further comprises means for receiving from the first device an indication for triggering a transmission of a further reference signal; and means for transmitting the further reference signal on the uplink channel to the first device.

Figure 7:
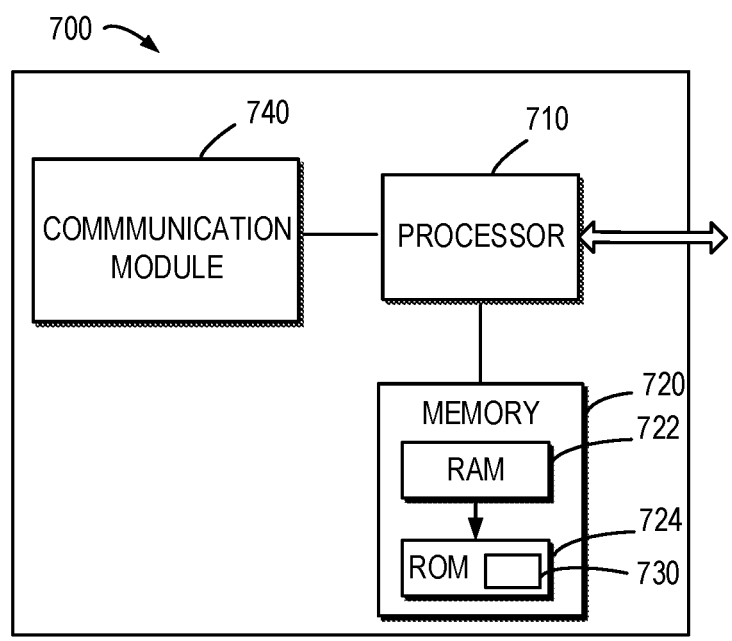
FIG. 7 illustrates a simplified block diagram of an apparatus that is suitable for implementing example embodiments of the present disclosure.

FIG. 7 is a simplified block diagram of a device 700 that is suitable for implementing example embodiments of the present disclosure. The device 700 may be provided to implement a communication device, for example, the first device 110 or the second device 120 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has one or more communication interfaces to facilitate communication with one or more other modules or devices. The communication interfaces may represent any interface that is necessary for communication with other network elements. In some example embodiments, the communication module 740 may include at least one antenna.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the memory, e.g., ROM 724. The processor 710 may perform any suitable actions and processing by loading the program 730 into the RAM 722.

Example embodiments of the present disclosure may be implemented by means of the program 730 so that the device 700 may perform any process of the disclosure as discussed with reference to FIGS. 3 to 6. The example embodiments of the present disclosure may also be implemented by hardware or by a combination of software and hardware.

Figure 8:
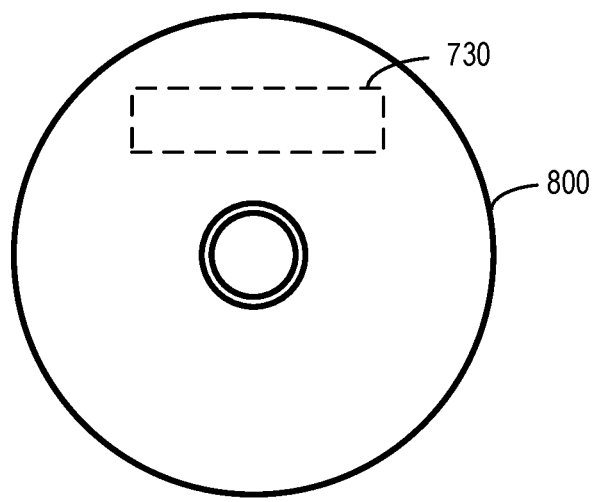
FIG. 8 illustrates a block diagram of an example computer readable medium in accordance with some example embodiments of the present disclosure.

In some example embodiments, the program 730 may be tangibly contained in a computer readable medium which may be included in the device 700 (such as in the memory 720) or other storage devices that are accessible by the device 700. The device 600 may load the program 730 from the computer readable medium to the RAM 722 for execution. The computer readable medium may include any types of tangible non-volatile storage, such as ROM, EPROM, a flash memory, a hard disk, CD, DVD, and other magnetic storage and/or optical storage. FIG. 8 shows an example of the computer readable medium 800 in form of an optical storage disk. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIGS. 3 to 8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
    at least one processor; and
    at least one memory including computer program codes;
    the at least one memory and the computer program codes are configured to, with the at least one processor, cause the first device to:
        receive, from at least one second device, a first reference signal on an uplink channel;
        determine a first channel information on the uplink channel based at least in part on the reference signal using a data processing model;
        determine a difference between the first channel information and a second channel information estimated based on the reference signal;
        recover a third channel information on a downlink channel from a feedback signal from the at least one second device using the data processing model; and
        update the data processing model based on the difference and the third channel information.

2. The first device of claim 1, wherein the at least one processor and the computer program codes are configured to further cause the first device to:
    transmit a second reference signal on the downlink channel to the at least one second device; and
    receive from the at least one second device the feedback signal to the second reference signal, the feedback signal comprising extracted channel information on the downlink channel.

3. The first device of claim 1, wherein the at least one processor and the computer program codes configured to cause the first device to determine the first channel information by comprises the at least one processor and the computer program codes configured to cause the first device to:
    determine an original reference signal transmitted by the at least one second device;
    determine original channel information based on the original reference signal and the received reference signal; and
    recover the first channel information from the original channel information using the data processing model.

4. The first device of claim 1, wherein the at least one processor and the computer program codes configured to cause the first device to update the data processing model comprises the at least one processor and the computer program codes configured to cause the first device to:
    determine whether the difference exceeds a threshold difference;
    determine whether a channel quality of the downlink channel exceeds a threshold quality based on the third information; and in accordance with a determination that the difference is below the threshold difference and the channel quality exceeds the threshold quality, cause the data processing model to be maintained.

5. The first device of claim 4, wherein the at least one processor and the computer program codes are configured to further cause the first device to:
for a target second device in the at least one second device,
determine whether the difference exceeds a threshold difference;
determine whether the channel quality of the downlink channel between the first device and the target second device exceeds a threshold quality based on the third information; and
in accordance with a determination that the difference is below the threshold difference and the channel quality is below the threshold quality, cause scheduling of the target second device to be skipped.

6. The first device of claim 4, wherein the at least one processor and the computer program codes are configured to further cause the first device to:
for a target second device in the at least one second device,
determine whether the difference exceeds a threshold difference;
determine whether the channel quality of the downlink channel between the first device and the target second device exceeds a threshold quality based on the third information;
in accordance with a determination that the difference exceeds the threshold difference and the channel quality exceeds the threshold quality, receive a third reference signal on the uplink channel from the target second device;
re-evaluate the difference based on the third reference signal; and
re-evaluate the channel quality based on the feedback signal or a further feedback signal received from the at least one second device.

7. The first device of claim 6, wherein the at least one processor and the computer program codes are configured to further cause the first device to:
update the data processing model based on the third reference signal.

8. The first device of claim 4, wherein the at least one processor and the computer program codes are configured to further cause the first device to:
for a target second device in the at least one second device,
determine whether the difference exceeds a threshold difference;
determine whether the channel quality of the downlink channel between the first device and the target second device exceeds a threshold quality based on the third information;
in accordance with a determination that the difference exceeds the threshold difference and the channel quality is below the threshold quality, cause scheduling of the target second device to be skipped; and
update the data processing model based on the first reference signal.

9. The first device of claim 1, wherein the at least one processor and the computer program codes configured to cause the first device to update the data processing model comprises the at least one processor and the computer program codes configured to cause the first device to:

determine whether the difference exceeds a threshold difference;
determine whether the channel quality of the downlink channel between the first device and the target second device exceeds a threshold quality based on the third information;
in accordance with a determination that the difference exceeds the threshold difference and the channel quality exceeds the threshold quality, receive a fourth reference signal on the uplink channel from the at least one second device;
re-evaluate the difference based on the fourth reference signal; and
re-evaluate the channel quality based on the feedback signal or a further feedback signal received from the at least one second device.

10. The first device of claim 9, wherein the at least one processor and the computer program codes are configured to further cause the first device to:
update the data processing model based on the fourth reference signal.

11. The first device of claim 1, wherein the at least one processor and the computer program codes configured to cause the first device to update the data processing model comprises the at least one processor and the computer program codes configured to cause the first device to:
determine whether the difference exceeds a threshold difference;
determine whether a channel quality of the downlink channel exceeds a threshold quality based on the third information;
in accordance with a determination that the difference is below the threshold difference and the channel quality is below the threshold quality, cause the data processing model to be inactive; and
switch to a non-neutral network processing mode.

12. The first device of claim 1, wherein the at least one processor and the computer program codes configured to cause the first device to update the data processing model comprises the at least one processor and the computer program codes configured to cause the first device to:
determine whether the difference exceeds a threshold difference;
determine whether a channel quality of the downlink channel exceeds a threshold quality based on the third information;
in accordance with a determination that the difference is above the threshold difference and the channel quality is below the threshold quality, cause the data processing model to be inactive;
switch to a non-neutral network processing mode; and
update the data processing model based on the first reference signal.

13. The first device of claim 1, wherein the first device is a network device and the at least one second device is at least one terminal device.

14. A second device comprising:
at least one processor; and
at least one memory including computer program codes;
the at least one memory and the computer program codes are configured to, with the at least one processor, cause the second device to:
transmit, to a first device, a first reference signal on an uplink channel, the first reference signal for determining first channel information and second channel information on the uplink channel, and the first channel information being for determining a data processing model to be for recovering channel information on a downlink channel between the first device and the second device; and transmit a feedback signal to the first device, the feedback signal being for recovering third channel information on a downlink channel between the first device and the second device.

15. The second device of claim 14, wherein the at least one processor and the computer program codes are configured to further cause the second device to:

receive a second reference signal on the downlink channel from the first device; and wherein the second device is caused to transmit the feedback signal by:

transmit the feedback signal comprising extracted channel information on the downlink channel.

16. The second device of claim 14, wherein the at least one processor and the computer program codes are configured to further cause the second device to:

receive from the first device an indication for triggering a transmission of a further reference signal; and transmit the further reference signal on the uplink channel to the first device.

17. The second device of claim 14, wherein the first device is a network device and the second device is a terminal device.

* * * * *